United States Patent [19]

Drummond et al.

[11] 3,895,393

[45] July 15, 1975

[54] DOUBLE COMB FILTER

[75] Inventors: Ruth Eleanor Drummond, Kitchener; John D. Lovely, Waterloo, both of Canada

[73] Assignee: Electrohome Limited, Kitchener, Canada

[22] Filed: May 14, 1974

[21] Appl. No.: 469,630

[52] U.S. Cl. .................................................. 358/31
[51] Int. Cl. ........................................... H04n 9/535
[58] Field of Search .............. 358/30, 31, 39, 40, 21

[56] References Cited

UNITED STATES PATENTS

| | | | |
|---|---|---|---|
| 3,702,376 | 11/1972 | Isono et al. | 358/31 |
| 3,707,596 | 12/1972 | Kuhn | 358/31 |

*Primary Examiner*—Richard Murray
*Attorney, Agent, or Firm*—Sim & McBurney

[57] ABSTRACT

A first comb filter is employed to eliminate the chrominance subcarrier from a composite video signal containing chrominance information. The resultant signal contains certain undesired signals. These are cancelled by using a second comb filter to comb out the chrominance subcarrier from the signal from the delay line of the first comb filter leaving the undesired signals which are then added to the output signal of the first comb filter. The undesired signals cancel because they are in phase opposition.

12 Claims, 3 Drawing Figures

DOUBLE COMB FILTER

BACKGROUND OF THE INVENTION

This invention relates to a double comb filter. More particularly, this invention relates to a double comb filter for use in "combing" the interleaved color information from the luminance signal in a composite video signal of the type used in an NTSC color television system.

In an NTSC system the 3.58MHz chrominance information can have large amplitude excursions for highly saturated colors. Although 100% saturated colours rarely occur in nature, the subcarrier amplitude may be sufficient to cause an erroneous luminance component. The error results from the rectification of the subcarrier by the non-linear picture tube transfer characteristic (gamma). Thus it is necessary to remove or reduce the subcarrier in order to obtain correct color reproduction. In the past this has been achieved by the use of a trap or rejection filter tuned to the subcarrier frequency. However, such a trap produces amplitude and phase distortions that seriously affect the quality of the luminance signal and picture resolution.

It also is known to employ a delay line system to eliminate the 3.58MHz subcarrier. In this arrangement a high frequency carrier wave is modulated with the complete video signal. The modulated carrier then is passed through the delay line, delayed by one line and matrixed with the undelayed video signal for the next adjacent line in the scanning sequence resulting in a luminance signal devoid of chrominance information. Such a system has not been employed in consumer television applications, however, because it is extremely expensive.

SUMMARY OF THE INVENTION

In accordance with this invention it has been discovered that the problems created by employing a rejection filter can be solved using a double comb filter without going to the prohibitive (for consumer television) expense television) the system described in the preceding paragraph.

In an NTSC system the luminance information is "sampled" at the horizontal scanning rate and the luminance sidebands are spaced at horizontal intervals. The chrominance information is interleaved in the gaps between these horizontal intervals. This conserves spectrum space and permits the chrominance information to be transmitted using the original monochrome frequency allocation for the channel. A comb filter provides a means of "combing" the interleaved color information from the luminance signal. This is possible because in an NTSC system the subcarrier phase alternates 180° on each successive line in the scanning sequence to produce the dot crawl effect. Thus the subcarrier phase of line 5 is 180° out of phase with the subcarrier phase of line 7, just as the subcarrier phases of lines 6 and 8 are 180° apart. Thus, if it is possible to delay one line in the scanning sequence for exactly the time required to scan one line, a time of 63.555$\mu$ seconds, and then add the delayed signal to that of an adjacent line in the scanning sequence, it is theoretically possible to eliminate the subcarrier. In practice, however, the delay line used in a comb filter is designed to operate with a resistive generator and load. In order to provide the correct delay time, it is necessary to place an inductive component in the generator and load circuits to neutralize the effects of the capacitance of the delay line transducers.

The LC components form a resonant circuit that has sufficient Q to produce ringing after luminance transients. Although these effects may be reduced considerably by careful selection of the Q of the circuit, they cannot be eliminated entirely while maintaining delay line accuracy. This problem is overcome, in accordance with the instant invention, by using a second comb filter to comb out the chrominance subcarrier in the signal from the delay line of the first comb filter. The output of the second comb filter then will contain the undesired signals, and these then are used to cancel the undesired signals in the output of the first comb filter leaving only the luminance signal.

DETAILED DESCRIPTION OF THE INVENTION

Figure 1:
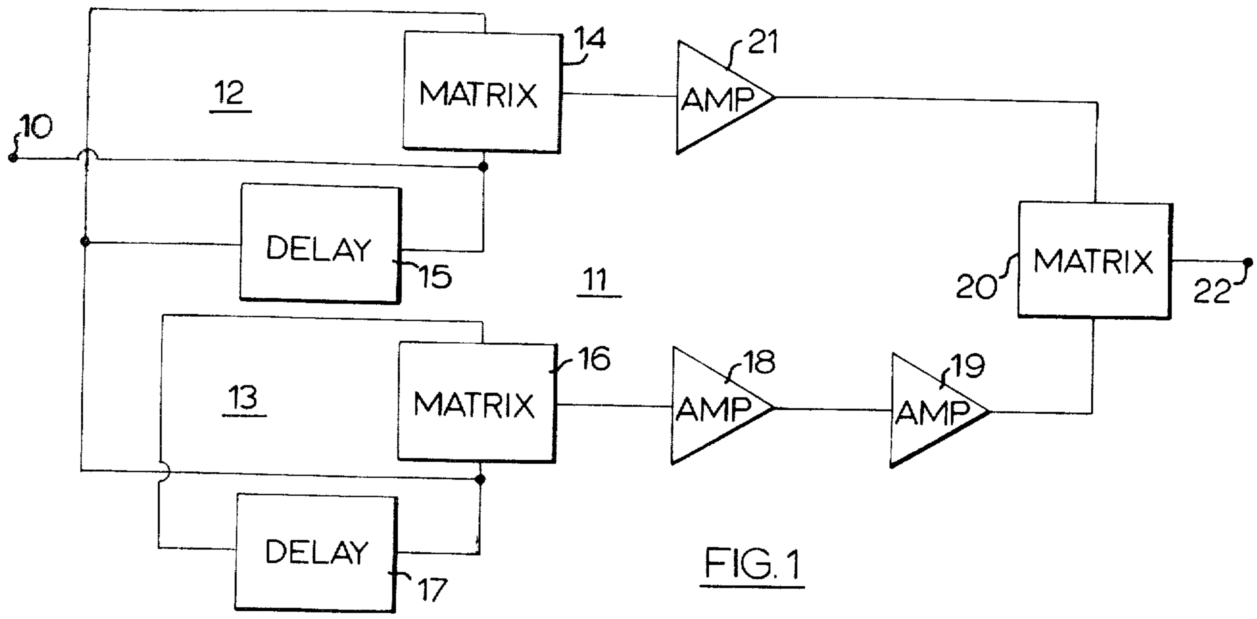
FIG. 1 is a block diagram of a network embodying this invention.

Referring to FIG. 1, the composite video signal containing both chrominance and luminance information is applied to the input terminal 10 of a double comb filter 11 that consists of two comb filters 12 and 13. This signal is supplied to one input terminal of a matrix network 14 and also to the input terminal of a delay network 15. The delay network provides a delay of exactly one line in the scanning sequence, namely 63.555$\mu$ seconds for an NTSC system. The delay network forms a bandpass filter (resonant circuit) which passes the 3.58MHz subcarrier and any portion of the luminance component that is within the passband of the filter. This output signal of the delay network is supplied to the other terminal of matrix 14 where it is added to the complete composite video signal that is supplied to the first-mentioned input terminal of matrix 14. Thus, the signal applied to the lower input terminal of matrix 14 at any point in time is exactly one line in the scanning sequence ahead of the signal applied to the upper input terminal, e.g., lines 100 and 98 respectively. The chrominance subcarriers in these two signals are out of phase. Thus cancellation of the chrominance information takes place in matrix 14. The output signal of matrix 14 thus is devoid of chrominance information. However, because of the ringing referred to hereinbefore, it contains an unwanted component which will be called the ringing signal.

The purpose of the second comb filter 13 is to eliminate the ringing signal. The output terminal of delay network 15 is connected to the lower input terminal of a matrix 16 and to the input terminal of another 63.555$\mu$ second delay network 17, the output terminal of which is connected to the upper input terminal of matrix 16. Thus complete cancellation of the chrominance signal in the output of delay network 15 occurs in matrix 16 leaving the ringing signal. This signal is amplified and inverted by an amplifier 18 and then is amplified by an amplifier 19 to the same level as the ringing signal which is supplied, after amplification by an amplifier 21, to the upper input terminal of a matrix 20. The ringing signals cancel in matrix 20 leaving, at the output terminal 22 of matrix 20, the desired luminance signal devoid of both chrominance information and the ringing signal.

Figure 2:
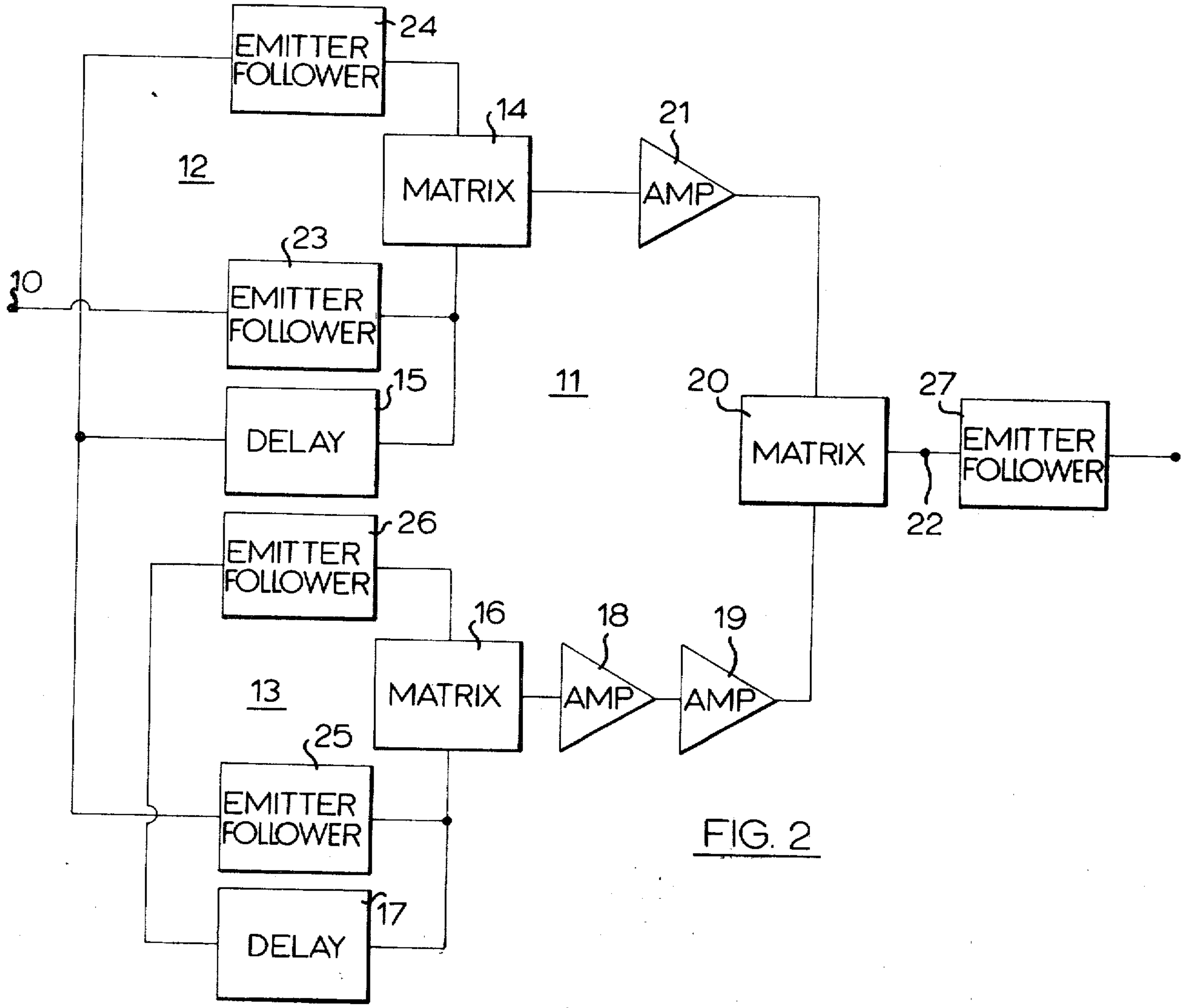
FIG. 2 is a block diagram of a more practical network for use in practicing this invention.

The double comb filter shown in FIG. 2 is identical to that shown in FIG. 1 except for the addition of buffer amplifiers 23, 24, 25, 26 and 27. These may be emitter follower amplifiers and are provided for isolation between input and output.

Figure 3:
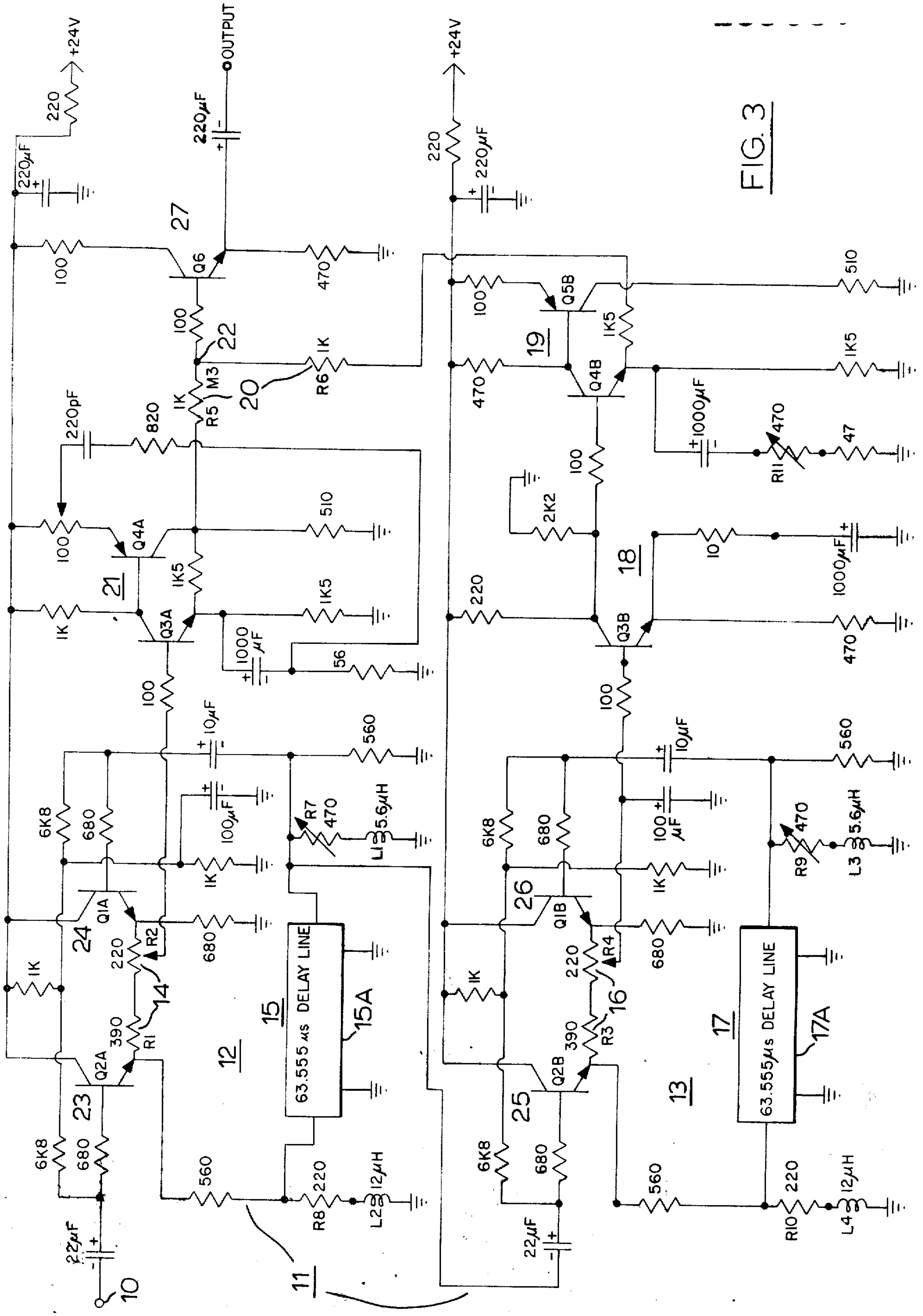
FIG. 3 is a circuit diagram of the network of FIG. 2.

Referring now to FIG. 3, which is a circuit diagram of the various component networks shown in FIG. 2, in comb filter 12 emitter followers 23 and 24 are constituted by transistors Q2A and Q1A and their associated components, resistors R1 and R2 constitute matrix 14 and delay network 15 is constituted by a glass delay line 15A, resistors R7 and R8 and coils L1 and L2. Resistor R7 is variable so that the phase of the input signal to delay line 15A can be made identical to the phase of the output signal thereof. Delay line 15A, like the delay line 17A of the second comb filter, is a very thin slab of zero TC glass provided with two transducers and available under No. DL55 from Philips Electron Devices.

In comb filter 13 emitter followers 25 and 26 are constituted by transistors Q2B and Q1B and their associated components, resistors R3 and R4 constitute matrix 16 and delay network 17 is constituted by delay line 17A, resistors R9 and R10 and coils L3 and L4. Resistor R9, like resistor R7, is variable for phase trim purposes.

Amplifier 18 is constituted by transistor Q3B and its associated components, while transistors Q4B and Q5B and their associated components constitute amplifier 19. Amplifier 21 is constituted by transistors Q3A and Q4A and their associated components. The network connected between the emitter of transistor Q3A and the emitter of transistor Q4A is for high frequency compensation. Resistors R5 and R6 constitute matrix 20, while transistor Q6 and its associated components constitute emitter follower 27.

It is to be understood that the values of the components given in FIG. 3 are exemplary only. It will be noted, however, that resistors R1 and R2, like resistors R3 and R4 are of unequal value. This is done to compensate for the delay line losses. Amplifier 21, on the other hand, makes up for system losses so that the signal output voltage equals the signal input voltage. Amplifier 18 inverts the ringing signal so that it will be 180° out of phase with the ringing signal in the output of amplifier 21. The level of the ringing signal in the output of comb filter 13 is adjusted by varying the gain of amplifier 19 by means of variable resistor R11 so that both ringing signals applied to matrix 20 will have the same amplitude. This being the case, resistors R5 and R6 can be of equal magnitude. As another alternative, amplifier 19 may be eliminated and resistors R5 and R6 made unequal to compensate for the different signal amplitudes.

Those skilled in the art will appreciate that the placement of phase inverting amplifier 18 is not critical. It could, for example, be placed between matrix 14 and amplifier 21. In this case it would be in the main signal path, however, and it is preferred that it be located where shown in the Figures.

It also should be understood that the apparatus disclosed herein can be used for processing signals other than a composite video signal. In general it can be used for processing any signal where the component to be cancelled is interleaved with the component that is to remain and where the phase of the component to be cancelled reverses at predetermined intervals.

What we claim is:

1. Apparatus for processing a signal of a type that contains first and second components, said first components occurring at intervals, said second components also occurring at intervals and being interleaved between said first components, said second components also alternating in phase at predetermined intervals; said apparatus comprising a first comb filter having an input terminal to which said signal is applied, a first signal adding network and a first delay network, said first signal adding network having first and second input terminals and an output terminal, said first delay network having an input terminal and an output terminal and a time delay equal to said predetermined interval, means connecting said input terminal of said first comb filter to said first input terminal of said first signal adding network and to said input terminal of said first delay network for supplying said signal thereto, means connecting said output terminal of said first delay network to said second input terminal of said first signal adding network for adding the delayed output signal of said first delay network to said signal supplied to said first input terminal of said first signal adding network to provide an output signal at said output terminal from which said second components have been cancelled, said output signal including an unwanted signal component generated in said first delay network; a second comb filter having an input terminal, a second signal adding network and a second delay network, said second signal adding network having first and second input terminals and an output terminal, said second delay network having an input terminal and an output terminal and a time delay equal to said predetermined interval; means connecting said output terminal of said first delay network to said input terminal of said second comb filter for supplying said delayed output signal of said first delay network thereto, said delayed output signal including said unwanted signal component; said second comb filter also including means connecting said input terminal thereof to said first input terminal of said second signal adding network and to said input terminal of said second delay network for supplying said delayed output signal thereto and means connecting said output terminal of said second delay network to said second input terminal of said second signal adding network for adding the delayed output signal of said second delay network to said signal supplied to said first input terminal of said second signal adding network to provide an output signal at said output terminal of said second signal adding network from which said second components have been cancelled but which contains said unwanted signal component; a third signal adding network having first and second input terminals and an output terminal; and means connecting said output terminals of said first and second signal adding networks to said first and second input terminals respectively of said third signal adding network for supplying said output signals at said output terminals of said first and second signal adding networks respectively with said unwanted signals in phase opposition to said first and second input terminals respectively of said third signal adding network to add the signal at a said second input terminal of said third signal adding network to the signal at said first input terminal thereof to provide an output signal at said output terminal of said third signal adding network from which both said second components and said unwanted component have been cancelled.

2. Apparatus according to claim 1 wherein said means connecting said output terminals of said first and second signal adding networks to said first and second input terminals respectively of said third signal adding network includes phase inverting means connected between one of said output terminals of said first or second signal adding networks and the input terminal of said third signal adding network to which said one output terminal is connected.

3. Apparatus according to claim 2 wherein said means connecting said input terminal of said first comb filter and said input terminals of said first signal adding network and said first delay network includes a buffer amplifier, said means connecting said output terminal of said first delay network and said second input terminal of said first signal adding network includes a buffer amplifier, said means connecting said input terminal of said second comb filter and said input terminals of said second signal adding network and said second delay network includes a buffer amplifier and said means connecting said output terminal of said second delay network and said second input terminal of said second signal adding network includes a buffer amplifier.

4. Apparatus according to claim 1 wherein said means connecting said input terminal of said first comb filter and said input terminals of said first signal adding network and said first delay network includes a buffer amplifier, said means connecting said output terminal of said first delay network and said second input terminal of said first signal adding network includes a buffer amplifier, said means connecting said input terminal of said second comb filter and said input terminals of said second signal adding network and said second delay network includes a buffer amplifier and said means connecting said output terminal of said second delay network and said second input terminal of said second signal adding network includes a buffer amplifier.

5. Apparatus according to claim 4 including a buffer amplifier having an input terminal connected to said output terminal of said third signal adding network.

6. Apparatus according to claim 5 wherein said buffer amplifiers are emitter follower amplifiers.

7. Apparatus according to claim 1 wherein said signal adding networks are resistive matrices.

8. Apparatus according to claim 1 wherein said means connecting said output terminals of said first and second signal adding networks to said first and second input terminals respectively of said third signal adding network includes means for amplifying at least one of said output signals of said first and second signal adding networks to a level such that said unwanted components in the signals applied to said input terminals of said third signal adding network are of equal amplitude.

9. Apparatus according to claim 8 wherein said means connecting said output terminals of said first and second signal adding networks to said first and second input terminals respectively of said third signal adding network includes phase inverting means connected between one of said output terminals of said first or second signal adding networks and the input terminal of said third signal adding network to which said one output terminal is connected.

10. Apparatus according to claim 9 wherein said means connecting said input terminal of said first comb filter and said input terminals of said first signal adding network and said first delay network includes a buffer amplifier, said means connecting said output terminal of said first delay network and said second input terminal of said first signal adding network includes a buffer amplifier, said means connecting said input terminal of said second comb filter and said input terminals of said second signal adding network and said second delay network includes a buffer amplifier and said means connecting said output terminal of said second delay network and said second input terminal of said second signal adding network includes a buffer amplifier.

11. Apparatus according to claim 10 wherein said signal adding networks are resistive matrices.

12. In a television receiver, apparatus of the type claimed in claim 1, said signal being a composite NTSC video signal, said first component being the luminance component thereof, said second component being the chrominance component thereof and said predetermined interval being the time for scanning of one complete line.

* * * * *